United States Patent
Webb et al.

(10) Patent No.: US 8,317,095 B2
(45) Date of Patent: *Nov. 27, 2012

(54) EXCEPTION NOTIFICATION SYSTEM AND METHOD

(75) Inventors: Greg Webb, South Jordan, UT (US); Jennifer D. Sauvageau, Sandy, UT (US); Carol Breinholt, West Valley City, UT (US); Sabina Sweat, Kearns, UT (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/244,177

(22) Filed: Sep. 23, 2011

(65) Prior Publication Data

US 2012/0016777 A1    Jan. 19, 2012

Related U.S. Application Data

(63) Continuation of application No. 12/349,741, filed on Jan. 7, 2009, now Pat. No. 8,056,801, which is a continuation of application No. 10/904,140, filed on Oct. 26, 2004, now Pat. No. 7,487,911.

(60) Provisional application No. 60/584,896, filed on Jul. 1, 2004.

(51) Int. Cl.
*G06K 5/00* (2006.01)

(52) U.S. Cl. .................... 235/380; 235/379; 235/381

(58) Field of Classification Search ............ 235/380, 235/379, 381; 705/39
See application file for complete search history.

(56) References Cited

U.S. PATENT DOCUMENTS

| | | | |
|---|---|---|---|
| 5,753,899 A | 5/1998 | Gomm et al. | |
| 5,859,419 A | 1/1999 | Wynn | |
| 6,422,462 B1 | 7/2002 | Cohen | |
| 6,829,596 B1 | 12/2004 | Frazee | |
| 6,857,565 B2 | 2/2005 | Smith | |
| 7,083,084 B2 | 8/2006 | Graves et al. | |
| 7,136,836 B1 | 11/2006 | Washizuka et al. | |
| 7,487,911 B2 | 2/2009 | Webb et al. | |
| 8,056,801 B2 * | 11/2011 | Webb et al. ................ | 235/380 |
| 2007/0187490 A1 | 8/2007 | Feldman et al. | |
| 2007/0294169 A1 | 12/2007 | Beck et al. | |

OTHER PUBLICATIONS

USPTO; Notice of Allowance dated Aug. 5, 2011 in U.S. Appl. No. 12/349,741.
USPTO; Advisory Action dated Jul. 6, 2011 in U.S. Appl. No. 12/349,741.

(Continued)

*Primary Examiner* — Ahshik Kim
(74) *Attorney, Agent, or Firm* — Snell & Wilmer L.L.P.

(57) ABSTRACT

A system and method for distributing prepaid cash alternatives and resolving exceptions related to the sale of prepaid cash alternatives such as traveler's cheques or prepaid cards. Reports of sales may be reviewed to identify exceptions, and information explaining the exceptions may be made available electronically. Sellers may be notified of exceptions by e-mail, which may include a link or address to information explaining the exceptions. The information may be provided in real time through a secure site on a network, such as the Internet. A company may contract with business partners to sell the prepaid cash alternatives to customers, and the business partners may report the sales to the company via reports. After being notified of exceptions, business partners may provide corrected information or new information to resolve the exceptions.

19 Claims, 2 Drawing Sheets

OTHER PUBLICATIONS

USPTO; Final Office Action dated Jun. 23, 2011 in U.S. Appl. No. 12/349,741.
USPTO; Office Action dated Mar. 30, 2011 in U.S. Appl. No. 12/349,741.
USPTO; Notice of Allowance dated Oct. 8, 2008 in U.S. Appl. No. 10/904,140.
USPTO; Office Action dated May 2, 2008 in U.S. Appl. No. 10/904,140.
PCT; International Search Report dated Jan. 8, 2007 in Application No. PCT/US2005/022706.
PCT; Written Opinion dated Jan. 8, 2007 in Application No. PCT/US2005/022706.
PCT; International Preliminary Report on Patentability dated Apr. 17, 2007 in Application No. PCT/US2005/022706.

* cited by examiner

EXCEPTION NOTIFICATION SYSTEM AND METHOD

CROSS-REFERENCE TO RELATED APPLICATION

This invention is a continuation of and claims priority to U.S. Ser. No. 12/349,741, filed on Jan. 7, 2009 and entitled "Exception Notification System and Method." The '741 application is a continuation of and claims priority to U.S. Pat. No. 7,487,911, issued on Feb. 10, 2009 (aka U.S. Ser. No. 10/904,140, filed on Oct. 26, 2004) and entitled "Exception Notification System and Method." The '911 patent claims priority to, and the benefit of, U.S. Provisional Application Ser. No. 60/584,896 filed Jul. 1, 2004, and entitled "Inventory Tracking System and Method." All of which are hereby incorporated by reference.

FIELD OF INVENTION

This invention generally relates to distribution of prepaid cash alternatives, and more particularly, to resolving exceptions related to the sale of traveler's cheques and prepaid cards.

BACKGROUND OF THE INVENTION

Traveler's cheques have been used for many years by travelers rather than cash because the traveler's cheques can be replaced without significant detriment if lost or stolen while traveling. In recent years, travelers are often replacing printed paper traveler's cheques with prepaid cards, which can be used similarly to a credit card, debit card, or the like, except that prepaid cards are paid for in advance. Similar to traveler's cheques, prepaid cards can be replaced if lost or stolen, and may be easier and quicker to replace than credit cards, debit cards, gift cards, or the like. Travelers typically use or spend the traveler's cheques or prepaid card balances at various businesses such as retail establishments, restaurants, hotels, and the like. These businesses then collect the monetary value of the charge from the issuer, for example, through a payment network.

In the past, AMERICAN EXPRESS has sold traveler's cheques and prepaid cards to customers through a large number of business partners located throughout the world. AMERICAN EXPRESS typically contracts with these business partners to sell AMERICAN EXPRESS traveler's cheques and prepaid cards to customers. AMERICAN EXPRESS typically requires that its business partners report sales to AMERICAN EXPRESS within a certain time period after each sale, and remit the appropriate amount collected for the sales to AMERICAN EXPRESS. AMERICAN EXPRESS typically reviews reports from business partners, and sometimes discovers discrepancies or exceptions in the reports. Such exceptions may include, for example, a discrepancy in the inventory of traveler's cheques, an error in cheque or card number, underpayment, overpayment, missing information, duplication, failure to report, or the like. In the past, AMERICAN EXPRESS has communicated with business partners regarding exceptions, for example, by mail, phone, e-mail, or the like, in order to attempt to resolve the exceptions. Other companies in the traveler's cheques or prepaid cards business have typically used a similar system to resolve exceptions.

In the prior art, resolution of exceptions typically required the attention of personnel to assemble the necessary information, contact business partners, and follow up if needed. In addition, a backlog of exceptions would usually accumulate, resulting in delay in addressing each exception. Further, some methods of communication, such as e-mail, were not secure and risks existed that confidential information would be compromised. Still further, in order to satisfy the business partners, exceptions were often corrected without the business partners being held accountable. As a result, business partners often did not learn or care to avoid repeating the same mistakes that caused the exceptions in the first place.

Therefore, a need exists for an improved system and method for notifying business partners of exceptions such that exceptions can be fully or partially corrected in an efficient, timely, and secure manner. A need also exists to facilitate business partners' learning from exceptions such that the exceptions are not often repeated.

SUMMARY OF THE INVENTION

This invention includes methods and systems for facilitating the distribution of prepaid cash alternatives and resolving exceptions related to the sale of prepaid cash alternatives. The prepaid cash alternatives may be traveler's cheques or prepaid cards, for example. The invention may provide benefits including, for example, correcting exceptions in a more efficient, timely, and secure manner, and encouraging business partners to learn from exceptions in an effort to reduce or minimize repeat exceptions. Specifically, resolution of exceptions may require less attention of personnel to assemble the necessary information, contact business partners, and follow up if needed, and may reduce the need for paper correspondence, and reduce the need for file space. In addition, a backlog of exceptions waiting to be sent to business partners may be avoided, thus avoiding a delay in addressing each exception. Further, in some embodiments, the invention may avoid insecure methods of communication, such as e-mail, which may involve communicating confidential information that could potentially be compromised. Still further, business partners or their employees may be held accountable or may suffer consequences for conduct that causes exceptions so that the business partners may be motivated to learn to avoid repeating the same mistakes that caused the exceptions in the first place.

In a specific embodiment, this invention includes method for facilitating the distribution of prepaid cash alternatives that may include selling a plurality of prepaid cash alternatives to customers, creating reports including information related to these sales, transmitting the reports to a host to facilitate the host reviewing the reports for exceptions, obtaining secure access through a network from the host to information that explains the exceptions, and, providing corrected information, new information, or both, to the host through the network to facilitate resolution of the exceptions. The method may also include receiving notification of the exceptions via e-mail, which may include a link or an address to the information that explains the exceptions. The information that explains the exceptions may be obtained in substantially real time, may be accessed through the Internet, and may be located on a webpage at a website that provides password protection. The corrected and new information may also be provided through an Internet webpage, and in some embodiments, the reports may be transmitted via the Internet.

In another specific embodiment, this invention provides a system for resolving exceptions related to the sale of prepaid cash alternatives that includes a computer having at least one processor and at least one storage medium configured to be read by the processor. The computer may be connected to a network, and reports may be stored on the storage medium that contain information related to the sales of cash alternatives that were submitted by associates who sold the cash alternatives. The computer may be configured to review the reports, identify exceptions in the reports, and make available to the associates, through a secure site on the network, information that explains the exceptions. The computer may further be configured to allow the associates to input corrected information, new information, or both, to resolve the exceptions, which may be submitted through the network. The computer may also be configured to automatically send e-mails to the associates to notify them of at least some types of exceptions, and the e-mails may contain links, addresses, or both, to the information that explains the exceptions.

In yet another specific embodiment, this invention provides a computer-readable storage medium containing a set of instructions for a general-purpose computer. The storage medium may contain instructions to review reports regarding sales of prepaid cash alternatives, which may include checking for exceptions. There may also be instructions to provide secure access through a network to information explaining the exceptions, and instructions to allow input of corrected information, new information, or both, to resolve the exceptions. The storage medium may also contain instructions to generate e-mails notifying of the exceptions. There may also be instructions to automatically react to an undeliverable e-mail by sending an e-mail to another e-mail address, for example.

BRIEF DESCRIPTION OF THE DRAWINGS

The figures in this document illustrate various exemplary embodiments of the present invention, wherein like reference numerals represent like elements. Embodiments of the invention may include part or all of the features shown in one of these drawings, or may include features from two or more figures. Accordingly.

DETAILED DESCRIPTION OF EXEMPLARY EMBODIMENTS

In general, the present invention includes methods and systems for facilitating the distribution of prepaid cash alternatives and resolving exceptions related to the sale of prepaid cash alternatives. The invention may include an exception firewall or a proactive exception reduction or elimination system and method. The exceptions may be related to the sale of prepaid cash alternatives such as, for example, traveler's cheques or prepaid cards. The invention may include a host company reviewing reports of sales, identifying exceptions in the reports, and providing information that explains the exceptions to the seller. In some embodiments, sellers may be notified of the exceptions by e-mail, which may include a link or an address to the information explaining the exceptions. The information may be provided through a secure site on a network, such as the Internet, and may be presented in batch mode, periodically, or in substantially real time.

A host (e.g., company) may contract with business partners to sell prepaid cash alternatives to customers, and the business partners may transmit information related to the sales to the host in the form of reports. After being notified of exceptions, business partners may provide corrected information or new information to resolve the exceptions. The system may be configured to react to an undeliverable e-mail, such as by sending an e-mail to another e-mail address. A system may include, for example, a processor, a network or a connection to an existing network, and a storage medium configured to be read by the computer. Another embodiment of this invention includes a computer-readable storage medium containing a set of instructions for a general-purpose computer that includes certain instructions in accordance with the present invention.

Figure 1:
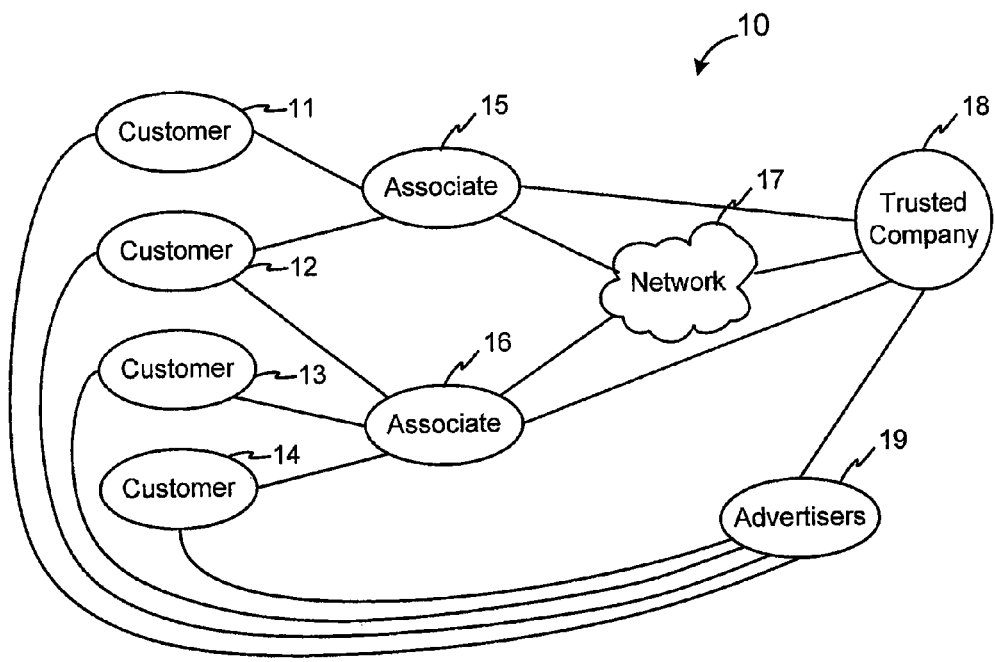
FIG. 1 is a block diagram illustrating various entities and components that may participate in an exemplary embodiment of the invention.

FIG. 1 illustrates various entities and components which are involved with or comprise an exemplary embodiment of the present invention. System 10 includes customers 11, 12, 13, and 14, associates or business partners 15 and 16, network 17, host (e.g., trusted company) 18, and advertisers 19. Host or trusted company 18 may have established a good reputation in the minds of customers 11-14, for example, through years of consistent service, a positive reputation created by advertisers 19, or a combination thereof. Company 18 may have one or more respected or famous trademarks or service marks, which may be promoted by advertisers 19. Trusted company 18 may be in the business of providing prepaid cash alternatives to customers 11-14. Trusted company 18 may include, for example, an entity, host, person, organization, government entity, non-profit organization, software and/or hardware. The company AMERICAN EXPRESS is an example of host or trusted company 18.

The prepaid cash alternatives may include, for example, traveler's cheques, prepaid cards, gift cards, travel fund cards, rewards card, debit card, telephone card, embossed card, smart card, magnetic stripe card, bar code card, transponder, radio frequency card, an associated account, or the like, provided they are paid for in advance.

For the convenience of customers 11-14, company 18 may provide a large number of business locations where customers 11-14 can purchase prepaid cash alternatives, obtain replacements for the cash alternatives if they are lost or stolen, or the like. In FIG. 1, associates 15 and 16 represent two of these locations. Associates 15 and 16 may be business partners or selling partners of host or company 18, and may be distributors of company's 18 products. Associates 15 and 16 may be banks, credit unions, merchants, travel agents, retailers, malls, AARP, or the like. Associates 15 and 16 may sell to customers 11-14, for example, in person, through a website, by mail, by fax, or by phone, for example. Company 18 may contract with associates 15 and 16 to sell company's 18 products, such as prepaid cash alternatives, to customers, such as customers 11-14. Associates 15 and 16 may display trademarks or service marks of trusted company 18, and may advertise in other ways that they sell and service products of company 18. A particular customer, such as customer 12, for example, may purchase traveler's cheques, as an example, from associate 15, but may then go to associate 16 for replacement traveler's cheques if the original traveler's cheques are lost or stolen. Associate 16 may be located remote from associate 15, such as in a different country. As used herein, associate may be a separate company separate from company 18 (e.g., a business partner or selling partner), a division, branch, affiliate, subsidiary, owner, or part of host or company 18, an entity, a person, an organization, a government entity, a non-profit organization, software, hardware, or a combination thereof.

Still referring to FIG. 1, associates 15 and 16 may communicate with host or trusted company 18 through a network 17.

Network 17 may be a local area network (LAN) a wide area network (WAN), a credit card network, the Internet, or the like. Associates 15 and 16 may report sales and other transactions involving company's 18 products to company 18. In fact, associates 15 and 16 may be required to make such reports by their contracts with company 18, for example, within a certain period after a sale is made. Associates 15 and 16 may report some or all information to company 18 electronically, for example, via network 17.

Figure 2:
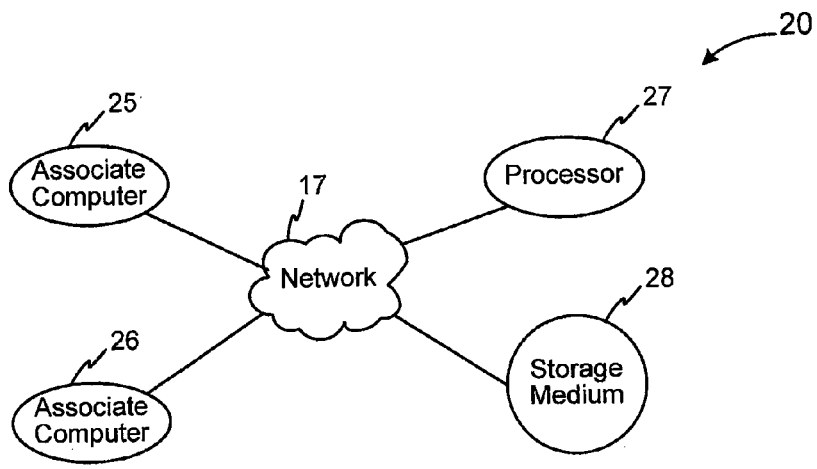
FIG. 2 is a block diagram illustrating the components of a configuration of an exemplary embodiment of the invention.

FIG. 2 illustrates various electronic components that are involved with or comprise an exemplary embodiment of the invention. System 20 includes associate computers 25 and 26, network 17, processor 27, and storage medium 28. Associate computers 25 and 26 may be owned, operated, or both, by or for associates 15 and 16 illustrated in FIG. 1, for example. Similarly, Processor 27 and storage medium 28, may be owned, operated or both, by or for host or trusted company 18, for example. Although two associate computers 25 and 26 are shown, and one processor 27 and one storage medium 28, embodiments of the present invention may have more of these components. Further, processor 27 and storage medium 28 may be combined in one or more computers, servers, or the like. Associate computers 25 and 26 may interface with at least one processor 27 via network 17, and processor 27 may interface with at least one storage medium 28. Associate computers 25 and 26, and computer or processor 27, may each have a connection to, or may be in communication with, network 17.

The various system components discussed herein may include one or more of the following: a host server or other computing systems including a processor (e.g., processor 27) for processing digital data; a memory (e.g., storage medium 28) coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases, which may be located on storage medium 28. Various databases used herein may include: seller data; inventory data; client data; merchant data; financial institution data; and/or like data useful in the operation of the present invention.

As those skilled in the art will appreciate, user computers, such as associate computers 25 and 26, may include an operating system (e.g., Windows NT, 95/98/2000, OS2, UNIX, Linux, Solaris, MacOS, etc.) as well as various conventional support software and drivers typically associated with computers. The computer may be or include a suitable personal computer, network computer, workstation, minicomputer, mainframe or the like. A user computer, such as associate computers 25 and 26, may be in a business environment with access to network 17. In an exemplary embodiment, access is through network 17 or the Internet through a commercially-available web-browser software package.

As used herein, the term "network" shall include an electronic communications network, and may incorporate hardware or software components or both. Communication among the parties in accordance with the present invention may be accomplished through suitable communication channels, such as, for example, an extranet, an intranet, Internet, point of interaction device (point of sale device, personal digital assistant, kiosk, etc.), online communications, satellite communications, off-line communications, wireless communications, transponder communications, local area network (LAN), wide area network (WAN), networked or linked devices, keyboard, mouse and/or a suitable communication or data input modality. Moreover, although the invention may be implemented with TCP/IP communications protocols, the invention may also be implemented using IPX, Appletalk, IP-6, NetBIOS, OSI or other protocols. In embodiments where network 17 is a public network, such as the Internet, it may be advantageous to presume network 17 to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to network 17 via data links which may include, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that network 17 may be implemented as other types of networks, such as an interactive television (ITV) network. Moreover, the system contemplates the use, sale or distribution of any goods, services or information over any network having similar functionality described herein.

As used herein, "transmit" may include sending electronic data from one system component to another over a network connection. Additionally, as used herein, "data" may include encompassing information such as commands, queries, files, data for storage, and the like in digital or another form.

Databases discussed herein, such as databases on storage medium 28, may be relational, hierarchical, graphical, object-oriented, and/or other database configurations. Common database products that may be used to implement the invention include DB2 by IBM (White Plains, N.Y.), various database products available from Oracle Corporation (Redwood Shores, Calif.), Microsoft Access or Microsoft SQL Server by Microsoft Corporation (Redmond, Wash.), or another suitable database product. Moreover, the databases may be organized in a suitable manner, for example, as data tables or lookup tables. Each record may be a single file, a series of files, a linked series of data fields or another data structure. Association of certain data may be accomplished through a desired data association technique such as those known or practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in pre-selected databases or data sectors.

More particularly, a "key field" may partition a database according to the high-level class of objects defined by the key field. For example, certain types of data may be designated as a key field in a plurality of related data tables and the data tables may then be linked on the basis of the type of data in the key field. The data corresponding to the key field in each of the linked data tables may be the same or of the same type. However, data tables having similar, though not identical, data in the key fields may also be linked by using AGREP, for example. In accordance with one aspect of the present invention, a suitable data storage technique may be utilized to store data without a standard format. Data sets may be stored using a suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); block of binary (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a Binary Large Object (BLOB). Thus, binary information may be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments of the present invention, data can be stored, for example, in storage medium 28, without regard to a common format. However, in one exemplary embodiment of the present invention, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. These condition annotations may be discussed further herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, seller, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The present invention may contemplate a data storage arrangement wherein the header or trailer, or header or trailer history, of the data is stored on the transaction instrument in relation to the appropriate data.

One skilled in the art will also appreciate that, for security reasons, databases, systems, devices, servers or other components of the present invention, such as storage medium 28 or the databases thereon, may consist of a combination thereof at a single location or at multiple locations, wherein each database or system may include various suitable security features, such as firewalls, access codes, encryption, decryption, compression, decompression, and/or the like.

The computers discussed herein, such as computer or processor 27 and storage medium 28, may provide a suitable website or other Internet-based graphical user interface which is accessible by users, such as associates 15 and 16. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, software provided by Siebel Systems, Inc. may be used, for example, for providing secure, password-protected web-based services for associates 15 and 16. In addition to other services, software or systems may provide inventory management, tracking the status of shipments, inventory statements, downloadable inventory shipment data, acknowledgement of receipt, or a combination thereof.

The communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and the like. A server may include a web service that receives a request from a web server, the request including a URL (http://yahoo.com/stockquotes/ge) and an IP address (123.56.789). The web server may retrieve the appropriate web pages and send the data or applications for the web pages to the IP address. Web services may be applications that are capable of interacting with other applications over a communications system, such as the internet. Web services may be based on standards or protocols such as XML, SOAP, WSDL and UDDI. Web services methods are generally well known in the art, and are covered in many standard texts. See, e.g., ALEX NGHIEM, IT WEB SERVICES: A ROADMAP FOR THE ENTERPRISE (2003), hereby incorporated herein by reference.

Further, the present invention may be described herein in terms of functional block components, screen shots, optional selections and various processing steps. It should be appreciated that such functional blocks may be realized by a number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors, such as processor 27, or other control devices. Similarly, the software elements of the present invention may be implemented with a programming or scripting language such as C, C++, Java, COBOL, assembler, PERL, Visual Basic, SQL Stored Procedures, extensible markup language (XML), with the various algorithms being implemented with a combination of data structures, objects, processes, routines or other programming elements. Further, it should be noted that the present invention may employ a number of conventional techniques for data transmission, signaling, data processing, network control, and the like. Still further, the invention may be used to detect or prevent security issues with a client-side scripting language, such as JavaScript, VBScript or the like. For a basic introduction of cryptography and network security, see the following references: (1) "Applied Cryptography: Protocols, Algorithms, And Source Code In C," by Bruce Schneier, published by John Wiley & Sons (second edition, 1996); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the present invention may be embodied as a customization of an existing system, an add-on product, upgraded software, a stand alone system, a distributed system, a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code embodied in the storage medium, such as storage medium 28, for example. A suitable computer-readable storage medium 28 may be utilized, which may include hard disks, CD-ROM, optical storage devices, magnetic storage devices, and/or the like.

The present invention is described herein with reference to block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such as processor 27, storage medium 28, or both, such that the instructions that execute on the computer or other programmable data processing apparatus implement the functions specified in the flowchart block or blocks. These computer program instructions may be stored in a computer-readable memory, such as storage medium 28, that can direct a computer or other programmable data processing apparatus, such as processor 27, to function in a particular manner, which may implement, for example, the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations for performing the specified functions, combinations of steps for performing the specified functions, and program instructions for performing the specified functions. It will also be understood that the functional blocks of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

One embodiment of the present invention includes a system for resolving exceptions related to the sale of prepaid cash alternatives, that may contain some of the components of system 20 illustrated in FIG. 2. The system may include at least one processor 27, a network 17 or a connection to an existing network 17, and at least one storage medium 28 configured to be read by processor 17. The system may be configured to review reports of sales of cash alternatives, which may be, for example, submitted by entities such as associates 15 and 16 who sell the cash alternatives. These reports may be submitted via associate computers 25 and 26, and network 17, to processor 27. The system may be configured to identify exceptions in the reports, and the system may be, in at least some embodiments, configured to make available to the associate, for example, through a secure site on network 17, information that explains the exceptions. Such information may be stored, for example, on storage medium 28. Further, the system may be configured to allow the associates to input corrected information, new information, or both, to resolve the exceptions. Such information may be input via associate computers 25 or 26, and through network 17, to processor 27, to storage medium 28, or both. In at least some embodiments, some or all of these steps may be automated, computer implemented, or the like, for example, using processor 27, storage medium 28, or both.

The system may further be configured to automatically send e-mails to the entities such as associate 15 or 16 to notify the associates of at least some types of the exceptions. Such e-mails may contain a link or an address to the information explaining the exceptions, for example, on storage medium 28. Network 17 may be, for example, the Internet, and the information explaining the exceptions may be located at a website, which may be stored on storage medium 28. Such a website may include password protection. Further, the corrected or new information may be provided through the website, and the reports may be submitted via the Internet.

Still another specific embodiment of the present invention includes a computer-readable storage medium 28 containing a set of instructions for a general-purpose computer (such as a computer that includes processor 27) that includes instructions to review reports regarding sales of prepaid cash alternatives. This review may include checking for exceptions, and instructions may also be provided to generate e-mails notifying of the exceptions. Such e-mails may be directed to, for example, associate 15 or 16, and may be sent, for example, via network 17. These e-mails may contain, for example, a link or an address to information explaining the exceptions (which may be located, for example, on storage medium 28), and instructions to allow input of corrected information, new information, or both, to resolve the exceptions. The reports, the corrected information, the new information, or a combination thereof, may be, for example, submitted through a password protected website. The storage medium 28 may further include instructions to automatically react to an undeliverable e-mail, such as by sending an e-mail to another e-mail address. As examples, if an e-mail to a particular individual within associate 15 is returned as undeliverable, then an e-mail may be sent to another individual within associate 15, or to a general e-mail address for associate 15, or to a person or group within company 18 who may then contact associate 15 another way. The host 18 may include a profile of each associate with primary, secondary, etc email addresses from which the system may obtain alternative email addresses.

Further, the information explaining the exceptions may be presented in substantially real time. In other words, rather than duplicating information stored in storage medium 28 to send that information to associate 16, the system may allow associate 16 access to view information stored in storage medium 28 directly, so that if company 18 inputs changes to the information, associate 16 will be able to see those changes essentially at the same time they are entered. For instance, in embodiments where associate 16 accesses information by viewing a webpage, associate 16 may be able to obtain updated information if associate 16 opens or refreshes the page within a short time after the information is updated by company 18. This short time may be, for example, the time it requires for the computers, network, and the like, to transmit the information. This may be, for example, just a few seconds or just a few minutes. The invention also contemplates partial updates, batch mode updates, periodic updates and other types of update routines.

Figure 3:
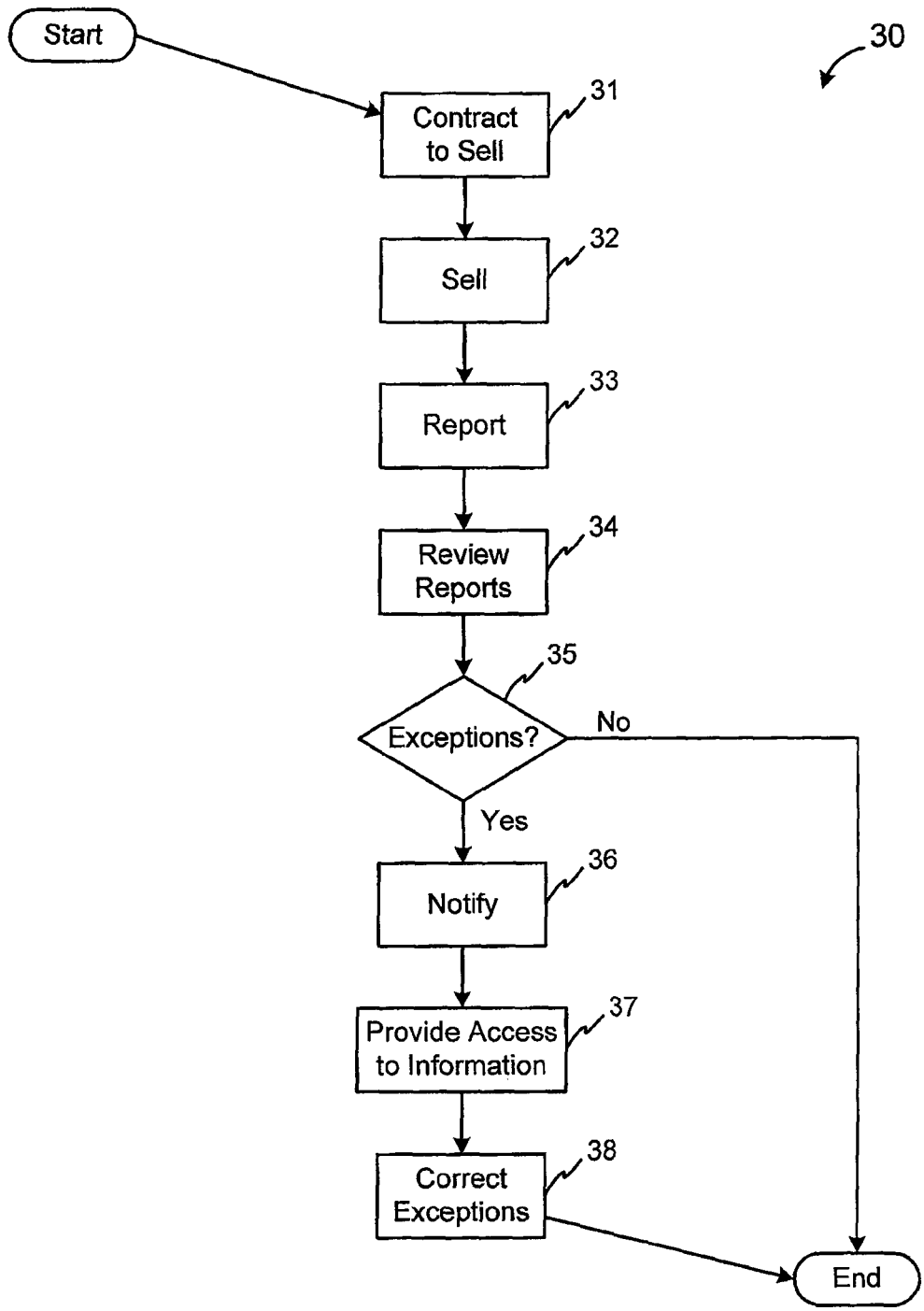
FIG. 3 is a flow chart illustrating various steps that may be completed in an exemplary method in accordance with the invention.

Proceeding to a method 30 in accordance with an exemplary embodiment of the present invention, FIG. 3 is a flow chart illustrating various steps that may be completed. These steps may also be implemented by a system in accordance with the present invention, or instructions to accomplish these steps may be stored on a computer readable storage medium, such as storage medium 28. A specific embodiment of the invention includes a method 30 of distributing prepaid cash alternatives, which may include the step of host or trusted company 18 contracting (step 31), for example, with a plurality of business partners such as associates 15 and 16, to sell the prepaid cash alternatives. The associates 15 and 16 may sell (step 32) the cash alternatives to customers 11-14 and record certain data related to the sales. This data may include, for example, the name of the customer, other identifying information of the customer, traveler's cheque numbers, prepaid card numbers, the amount of money collected, or the like. Associates 15 and 16 may report (step 33) the sales (from step 32) to the company 18 via reports that contain the data.

The company 18 may then review the reports (step 34), for example, for exceptions (step 35). Exceptions may be identified (step 35) automatically (e.g., by computer) or from human review of the data. A computer, such as processor 27, may first review a report (step 34) and identify exceptions (step 35). Exceptions may be identified, for example, by identifying missing information, identifying traveler's cheque or prepaid card numbers that are not recognizable, recognizing that the same traveler's cheque has been sold more than once, or the like. Trained personnel may then review the exceptions identified by the computer to verify that they are in fact exceptions, may review the report and identify additional exceptions not found by the computer, or both. If exceptions are found (in step 35), then company 18 may notify (step 36) the relevant associate(s) 15 or 16, of the exceptions. The notification may include notification to all related associates (e.g., chain of merchant stores), one particular merchant or any group or subset of merchants, the main office of an associate, a representative or subcontractor of an associate, or the like.

Exceptions may be classified and assigned error codes, which may be provided in the notification (step 36) or may be used within host or company 18, for example, for tracking and analyzing exceptions, evaluating or assisting associates 15 or 16, etc. Many different types of exceptions and many different error codes may exist, 300, for example. The error codes may identify the type of exception, or categorize the exceptions. Exceptions may include, for example, inventory issues, product or check stream number errors, duplicate payment, underpayment, overpayment, errors in identifying who made the sale, missing information, unclear or unrecognizable information, failure to report sales or the like.

Notification (step 36) may be by e-mail, for example, which may include providing a link or an address to information explaining the exceptions. In other embodiments notification may be by phone, facsimile, pager, blackberry, etc. Method 30 may include the step of providing access to associates 15 and 16, through a network 17, to information (step 37). Although the present invention may include various forms and channels of communication, as used herein, the phrase "access through a network" includes being able to read or view text, numbers, or both, on a website or in a computer database, from a remote location, but excludes providing information by audio or voice transmission, by fax, by e-mail, by regular mail or paper document, or by personnel physically going to a facility, for example, occupied by the host. The information (provided in step 37) may, for example, explain the exceptions. Notifications may be sent (step 36), for example, at periodic intervals, such as on a daily basis, or immediately when exceptions are detected (step 35). In some embodiments, associates 15 or 16 may be notified (step 36) of exceptions in other ways, such as by visiting a secure website where exceptions are posted. Notifications may include, for example, a statement that one or more exceptions exist, error codes, a brief description of the type of exception, a link or address to additional information on the exception, which may include information that explains the exceptions, information regarding the prepaid cash alternatives, information regarding sales, information regarding reports, or the like.

Associates 15 and 16 may also submit payments to company 18 for sales of prepaid cash alternatives by submitting an electronic payment or transaction account number, for example. Information regarding payment, or access to information, may be provided by company 18 to associates 15 and 16, for example, through a website (e.g., in step 37). In some embodiments, associates 15 and 16 may have the ability to view real time sales, payment, and unsettled discrepancies (e.g., exceptions) related to the sale and encashment of various products, including, for example, prepaid cash alternatives.

After associates are notified (step 36) of exceptions, the associate 15 or 16 may then provide corrected information, new information, or both, to company 18, which may be through network 17, to resolve the exceptions. In other words, the associate 15 or 16 may correct the exceptions (step 38). Associate 15 or 16 may correct exceptions (step 38) by generating a service request, for example, which may be submitted by e-mail, or through a website, for example. Information that is provided may include, for example, corrected traveler's cheque or prepaid card numbers, corrected dollar amounts, corrected customer identification information, or new information for any of these fields. For some embodiments, the corrected or new information may resolve some kinds of exceptions without human interaction on the part of the host, while other types of exceptions may involve human oversight. In other embodiments, resolution of exceptions may be fully automated, or may always be reviewed by appropriate personnel.

In some embodiments, associates 15 or 16 may outsource or contract out various functions to a third party, which may include reporting (step 33) and correcting exceptions (step 38). In such embodiments, the third party may be notified (step 36), provided access to information (step 37), or both. Further, the host or company 18 may outsource or contract out various functions otherwise performed by company 18. Thus, as used herein "associate" shall include the associate, an employee of the associate, or a representative or subcontractor of the associate authorized by the associate to perform the relevant task. Similarly, as used herein "host" shall include the host, an employee of the host, or a representative or subcontractor of the host authorized by the host to perform the relevant task.

Network 17 may be the Internet, and the information (provided in step 37) explaining the exceptions (identified in step 35) may be located at a website, which may be secured, such as through password protection, encryption, or both. Further, the corrected information or new information (of step 38) may be, for example, provided through network 17, such as by e-mail or through the website. Still further, the associates 15 and 16 may submit the reports (of step 33) via the Internet (network 17). Follow up notifications may be sent later (step 36) if needed, for example, if the associate 15 or 16 does not correct all of the exceptions (step 38). Follow up notifications may be sent to associate 15 or 16, for example, or to the responsible person or group within company 18, who then may contact associate 15 or 16 through other communication means or take other appropriate action. Correcting exceptions (step 38) may include submitting comments explaining the exceptions, and these comments may be reviewed by the appropriate personnel of company 18.

Since associates 15 and 16 correcting of exceptions (step 38) takes time and manpower, associates 15 and 16 may have an incentive to avoid creating exceptions. This may motivate associates 15 and 16 to implement whatever changes are necessary to their systems and procedures to avoid creating exceptions. In some embodiments, associates 15 and 16 may be given other incentives to avoid exceptions, such as withholding payment until exceptions are resolved, charging a fee or penalty, or the like.

Various embodiments of the present invention may be part of a larger web based system and method of inventory management services. In one embodiment, the invention includes a secure, password-protected, global, web-based platform with 24×7 web support. The invention may include various inventory management systems and methods including, for example, tracking of shipments, status of shipments, inventory statements, downloadable inventory shipment data and acknowledgement of receipt; interactive service requests; reconciliation exception resolution; notification process for reconciliation issues; on-line materials; and/or frequently asked questions. The invention may allow a seller, such as associates 15 or 16, to manage their own account hierarchy and/or access levels through website administrative functionality. The invention may further provide reporting and query capabilities (e.g., by volume, type, initiator, etc.). Internal views may allow the host or other support groups to capture and track seller interactions (e.g., phone, web, fax, mail), thereby helping to reduce repeat calls and re-work. Tracking may also facilitate the re-routing of seller issues to the relevant support group. Thus the invention may reduce paper intensive processes, and may result in a reduction of phone and mail interactions, for example, between associates 15 and 16 and trusted company 18. The invention may also reduce operating expenses (e.g., by automating and web-enabling services), increase turn-around time, increase customer retention, provide a better overall picture of customer needs, or a combination of these benefits.

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in the method or process descriptions may be executed in any order and are not limited to the order presented.

Further, benefits, other advantages, and solutions to problems have been described herein with regard to specific embodiments. However, the benefits, advantages, solutions to problems, and element(s) that may cause benefit, advantage, or solution to occur or become more pronounced are not to be construed as critical, required, or essential features or elements of the claims or the invention. Reference to an element in the singular is not intended to mean "one and only one" unless explicitly so stated, but rather "one or more." As used herein, the terms "comprises", "comprising", or a variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

What is claimed is:

1. A method comprising:
   receiving, by a computer based system for facilitating distribution of prepaid cash alternatives and through a network, at least one of corrected information or new information to facilitate resolution of the exceptions, wherein the exceptions are located on a webpage at a website having password protection;
   sending, by the computer based system, notification of at least a portion of the exceptions via electronic notification; and
   sending, by the computer based system, an electronic notification to another address, in response to an undeliverable electronic notification.

2. The method of claim 1, further comprising securely accessing, by the computer based system and through the network, the information that explains the exceptions.

3. The method of claim 1, further comprising receiving notification of at least a portion of the exceptions via electronic notification , wherein the electronic notification comprises at least one of a link or an address to the information that explains the exceptions.

4. The method of claim 1, further comprising providing at least one of corrected information or new information to the host computer through an Internet webpage.

5. The method of claim 1, wherein the distribution of the prepaid cash alternatives to customers comprises selling at least one of traveler's cheques, prepaid cards and prepaid accounts to customers.

6. The method of claim 1, further comprising enabling secure access through the network to the information that explains the exceptions by obtaining the information that explains the exceptions in substantially real time.

7. The method of claim 1, further comprising sending notification of at least a portion of the exceptions via electronic notification, wherein the electronic notification comprises at least one of a or an address to the information that explains the exceptions.

8. The method of claim 1, wherein the receiving at least one of corrected information or new information through the network comprises receiving at least one of corrected information or new information via an Internet webpage.

9. The method of claim 1, wherein the distribution of the prepaid cash alternatives to customers comprises selling at least one of traveler's cheques, prepaid cards and prepaid accounts to customers.

10. The method of claim 2, wherein the securely accessing the information that explains the exceptions comprises obtaining the information that explains the exceptions in substantially real time.

11. The method of claim 1, further comprising reviewing, by the computer based system, a report for exceptions, wherein the report includes information related to the distribution of the prepaid cash alternatives to a plurality of customers.

12. A system comprising:
   a processor for facilitating distribution of prepaid cash alternatives,
   a tangible, non-transitory memory configured to communicate with the processor,
   the tangible, non-transitory memory having instructions stored thereon that, in response to execution by the processor, cause the processor to perform operations comprising:
      receiving, by the processor and through a network, at least one of corrected information or new information to facilitate resolution of the exceptions, wherein the exceptions are located on a webpage at a website having password protection;
      sending, by the processor, notification of at least a portion of the exceptions via electronic notification; and
      sending, by the processor, an electronic notification to another address, in response to an undeliverable electronic notification.

13. The system of claim 12, further comprising securely accessing, by the processor and through the network, the information that explains the exceptions.

14. The system of claim 12, further comprising receiving notification of at least a portion of the exceptions via electronic notification, wherein the electronic notification comprises at least one of a link or an address to the information that explains the exceptions.

15. The system of claim 12, further comprising providing at least one of corrected information or new information to the host computer through an Internet webpage.

16. The system of claim 12, wherein the distribution of the prepaid cash alternatives to customers comprises selling at least one of traveler's cheques, prepaid cards and prepaid accounts to customers.

17. The system of claim 12, further comprising enabling secure access through the network to the information that explains the exceptions by obtaining the information that explains the exceptions in substantially real time.

18. The system of claim 12, further comprising reviewing, by the processor, a report for exceptions, wherein the report includes information related to the distribution of the prepaid cash alternatives to a plurality of customers.

19. An article of manufacture including a non-transitory, tangible computer readable medium having instructions stored thereon that, in response to execution by a computer-based system for facilitating distribution of prepaid cash alternatives, cause the computer-based system to perform operations comprising:
   receiving, by the computer based system and through a network, at least one of corrected information or new information to facilitate resolution of the exceptions, wherein the exceptions are located on a webpage at a website having password protection;
   sending, by the computer based system, notification of at least a portion of the exceptions via electronic notification; and
   sending, by the computer based system, an electronic notification to another address, in response to an undeliverable electronic notification.

* * * * *